No. 756,439. PATENTED APR. 5, 1904.
W. F. VROOMAN.
SIPHON GAGED LIQUID MEASURE.
APPLICATION FILED MAR. 1, 1902.
NO MODEL.
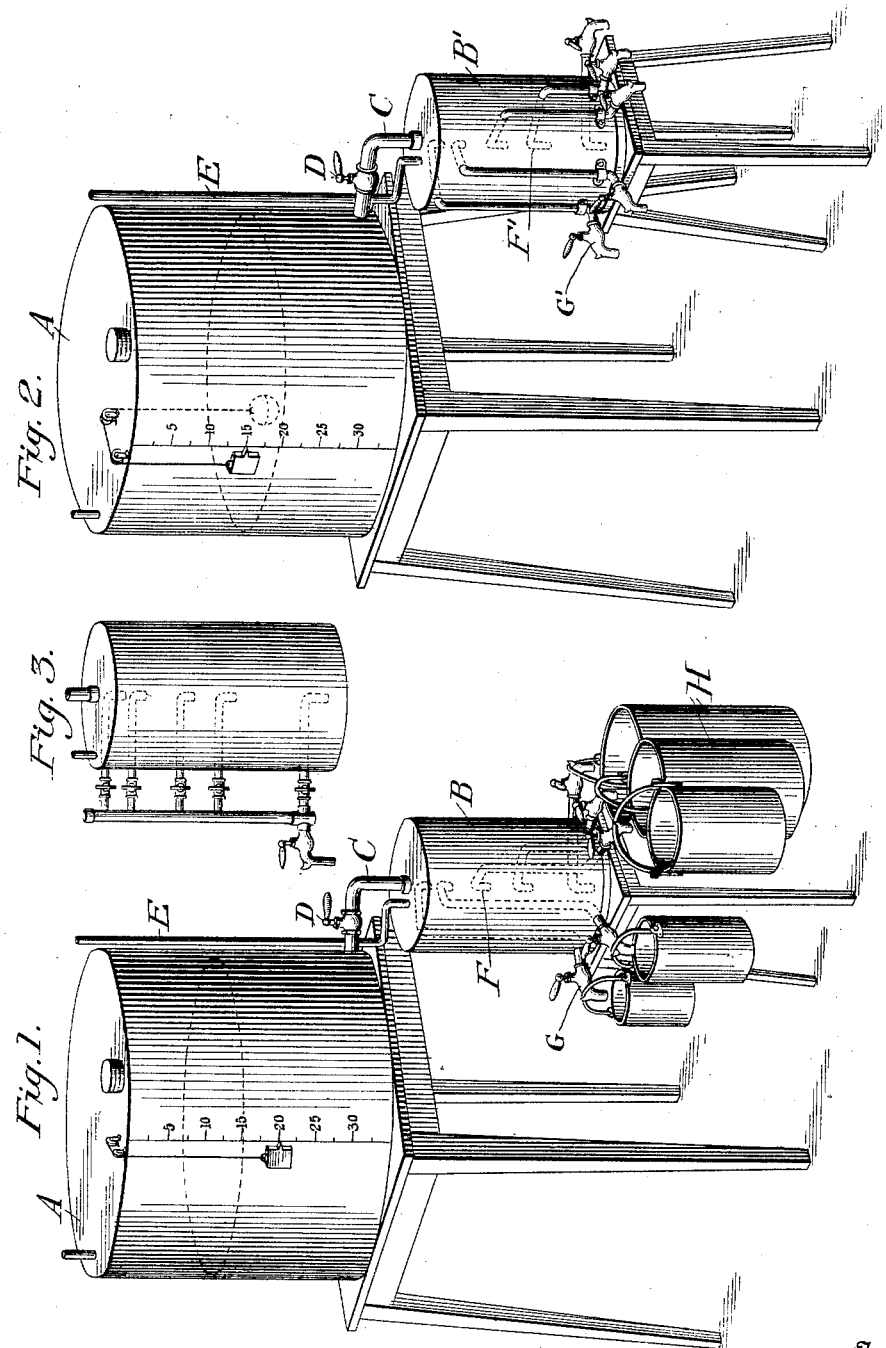

No. 756,439.

Patented April 5, 1904.

UNITED STATES PATENT OFFICE.

WARREN F. VROOMAN, OF NORTH MADISON, OHIO.

SIPHON-GAGED LIQUID-MEASURE.

SPECIFICATION forming part of Letters Patent No. 756,439, dated April 5, 1904.

Application filed March 1, 1902. Serial No. 96,307. (No model.)

*To all whom it may concern:*

Be it known that I, WARREN F. VROOMAN, a citizen of the United States, residing at North Madison, in the county of Lake and State of Ohio, have invented certain new and useful Improvements in Siphon-Gaged Liquid-Measures; and I do hereby declare the following to be a full, clear, and exact description of the invention, such as will enable others skilled in the art to which it appertains to make and use the same.

My invention relates to liquid-measuring vessels, and has for its object the provision of a siphon-gaged liquid-measuring device of novel construction capable of measuring out known quantities of liquid by the aid of siphons placed at known positions in the measuring vessel.

A special object of my invention is to provide a liquid-measuring device fitted with siphons having their intake ends turned downward, thereby producing a liquid-measuring device that will stop flowing instantly as soon as the siphon takes air.

In the drawings which form part of this specification similar characters of reference denote similar parts.

Figure 1 shows a perspective view of my siphon-gaged liquid-measure connected to a suitable reservoir-tank. Fig. 2 shows a perspective view of a modified construction of my siphon-gaged liquid-measure connected to a reservoir-tank and having a part of each siphon positioned outside of the liquid-measuring vessel. Fig. 3 shows a perspective view of another modified construction of my siphon-gaged liquid-measure having a main perpendicular pipe positioned outside of the measuring vessel and having a plurality of downward-turned siphons leading to the perpendicular pipe on the exterior of the siphon-gaged measuring-vessel.

In the drawings at A is shown a suitable reservoir fitted with a float and indicator.

At B is shown my preferred construction of my siphon-gaged liquid-measuring vessel, which measuring vessel should be connected to a reservoir by a pipe C having a stop-valve D. At E is shown an air-vent pipe, which pipe should stand a little higher than the top of the reservoir-tank. At F are shown by dotted lines five siphons positioned in the interior of the measuring vessel, which siphons have their intake ends turned downward, and the intake ends of the siphons are positioned at the center of the measuring vessel at known distances from the interior top of the measuring vessel and also at known distances from each other, so that each siphon will draw from the measuring vessel a known quantity of liquid. The siphons pass out through the side of the measuring vessel, and faucets G are connected to each siphon. The pails H hung upon the faucets simply represent receptacles for the liquid and are proportionate in size to the measure of liquid which can be drawn by each siphon.

To operate my siphon-gaged measure, first see that the reservoir-tank has a sufficient supply of the liquid. Then see that all the faucets are closed, and then open the stop-valve D until the liquid flows in and entirely fills the measuring-vessel B, and then close the stop-valve D. You may then open the faucet over the receptacle that is to receive the liquid, and the quantity which the connected siphon is calculated to draw will flow into the receptacle. Various quantities of liquid can be drawn by adding any of the quantities drawn by any of the various siphons.

Having fully described my invention, what I claim is—

1. In a siphon-gaged liquid-measurer, the combination with a liquid-measuring vessel, provided with a receiving pipe and an air-vent pipe; of a main perpendicular pipe positioned outside of said measuring vessel, and a series of horizontally-arranged pipes, attached to said main perpendicular pipe, leading to the interior of said measuring vessel and provided with downwardly-turned intake ends and positioned at the center of the measuring vessel.

2. In a siphon-gaged liquid-measurer, the combination with a suitable reservoir provided with a suitable float and indicator, and a liquid-measuring vessel provided with a receiving-pipe and an air-vent pipe; of a series of siphons suitably attached to said measuring vessel and having their intake ends turned down and positioned at the center of the measuring vessel.

3. A liquid-measuring vessel, consisting of a measuring vessel provided with a receiving-pipe and an air-vent pipe, a series of siphons suitably attached to said measuring vessel and having their intake ends turned down and positioned at the center of the measuring vessel, the intake ends of said siphons relatively distanced below each other and also relatively distanced below the interior top of said measuring vessel so as to allow known quantities of liquid to flow through each siphon, and stop-faucets connected to the outer ends of said siphons.

4. A liquid-measuring vessel, consisting of a measuring vessel provided with a receiving-pipe and an air-vent pipe, a series of siphons attached thereto and having their intake ends turned downward and positioned at the center of the measuring vessel, and stop-faucets connected to the outer ends of said siphons.

In testimony whereof I affix my signature in presence of two witnesses.

WARREN F. VROOMAN.

Witnesses:
H. C. VROOMAN,
F. B. WETMORE.